Aug. 20, 1940.   H. M. KENNARD   2,212,320
COFFEE MAKER OF THE VACUUM TYPE
Filed Feb. 13, 1939
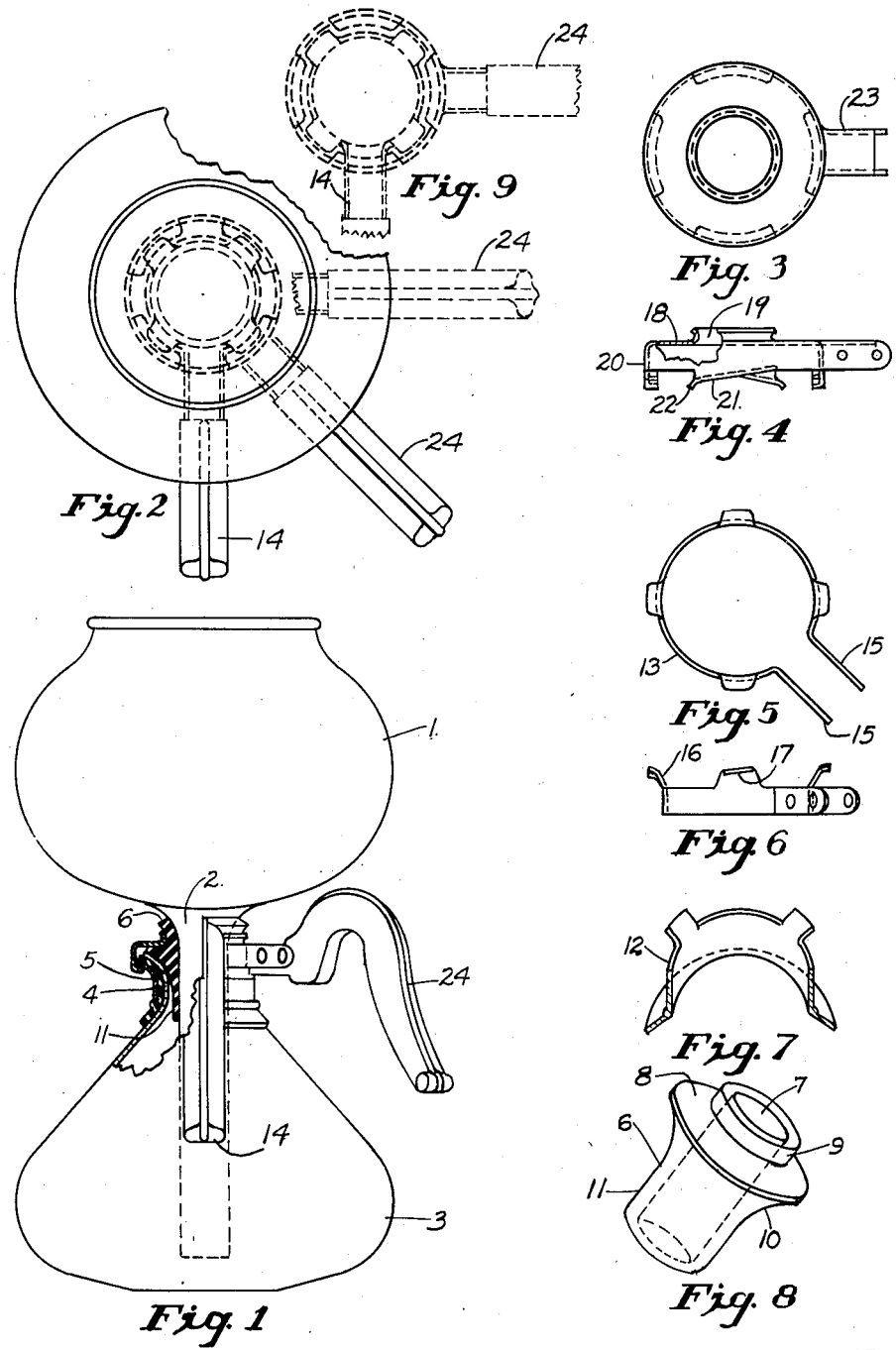
INVENTOR.
HARRY M. KENNARD.
BY Victor J. Evans & Co.
ATTORNEYS.

Patented Aug. 20, 1940

2,212,320

UNITED STATES PATENT OFFICE 2,212,320

COFFEE MAKER OF THE VACUUM TYPE

Harry M. Kennard, Santa Barbara, Calif., assignor of one-fourth to Clarence L. Colbert, Santa Barbara, Calif.

Application February 13, 1939, Serial No. 256,187

3 Claims. (Cl. 53—3)

This invention relates to coffee makers and more especially to sealing means for the upper and lower bowls of coffee makers of the so-called vacuum type.

An object of the invention is to provide a simple, practical and inexpensive seal for vacuum type coffee makers.

Another object is to provide a seal of the character described which is easy to manipulate; it obviates the likelihood of breaking the glass bowls.

Other objects and advantages will appear and be brought out more fully in the following specification, reference being had to the accompanying drawing, wherein:

Fig. 1 is a side view partly broken away of a vacuum type coffee maker showing my invention in connection therewith;

Fig. 2 is a top view of the same;

Figs. 3 to 8, inclusive, are detail views of the separate parts comprising the invention; and Fig. 9 is a view illustrating the initial engaging position of the parts.

Referring more particularly to the drawing, I show my invention as applied to a coffee maker having the usual upper bowl 1 provided with a downwardly extending stem 2, and a lower bowl 3 having a neck 4, the latter being provided with a bell-shaped mouth 5. A sealing element 6 of soft rubber having a cylindrical central opening 7 is adapted to be placed on stem 2 near the connection thereof with bowl 1. Sealing element 6 has a flat portion 8 forming an annulus 9 with the main body thereof and is further formed with a bell-shaped shoulder 10 which is adapted to rest on the bell-shaped portion of mouth 5. The element 6 has a substantially cylindrical portion 11 which in the operative position will be spaced from neck 4.

A pair of semi-cylindrical resilient members 12 are applied to the outside of neck 4 and are secured thereto by a metallic collar 13 secured to a handle 14 by extension portions 15, suitable securing screws being preferably used. Member 13 has a plurality, preferably four, of ears extending upwardly and outwardly therefrom, the upper flattened portions 17 thereof being inclined as clearly seen in Fig. 6. A complementary clamping member comprises essentially a plate member 18 having a central flared aperture 19 adapted to receive annulus 9 of element 6, the plate portion 18 adapted to rest on flat portion 8 of element 6.

Member 18 has a downwardly extending apron 20 and the latter is provided with a number of inwardly extending cam surfaces 21 equal in number to ears 16 and inclined similarly to the upper flattened portions 17 thereof. Cam surfaces 21 are peripherally spaced and if desired may be provided with downwardly curved leading edge portions 22 to facilitate engagement with ears 16. Member 18 is provided with a suitable extension 23 to which the handle 24 may be secured in a suitable manner.

The operation of the invention should be clear from the foregoing description. Member 18 will normally be securely held to element 6 and the latter held to stem 2 by the friction of the rubber and the upper bowl 1 is therefore substantially secured to handle 24 thereby. The dotted position of handle 24 in Figs. 2 and 9 indicates the position thereof and of the clamping members 18 and 16 while the upper bowl is being lowered into the lower bowl and the bell-shaped shoulder 10 of element 6 is placed on mouth 5. The reduced portion 11 of element 6 being of smaller diameter than neck 4, the assembly as just described is completed without appreciable effort. The handle 24 is then given a one-eighth turn to the left to the full position as shown in Figs. 1 and 2 and by this movement cam surfaces 21 will be engaged with upper flattened portions 17 of ears 16 and element 6 will be tightly sealed to neck 4. The bowls may be separated by the reverse movement in the well understood manner.

Having described my invention, what I claim is:

1. In a coffee maker or the like having a lower bowl provided with a neck and an upper bowl provided with a stem for said neck, the combination of sealing means for said stem and neck, said means comprising a resilient sleeve on said stem having a seating portion for said neck, a collar on said neck having a plurality of ears and a plate element secured to said sleeve and having a plurality of cams adapted for detachable engagement with said ears whereby to press said seating portion of the sleeve against the neck of said lower bowl.

2. In a coffee maker or the like having a lower bowl provided with a neck and an upper bowl provided with a stem for said neck, the combination of sealing means for said stem and neck, said means comprising a resilient sleeve on said stem having a seating portion for said neck, a collar on said neck having a plurality of ears and a plate element secured to said sleeve having a handle and having a plurality of cams adapted for detachable engagement with said ears whereby to press said seating portion of the sleeve against the neck of said lower bowl, when said cams are brought into rotated engagement with said ears by said handle.

3. In a coffee maker or the like having a lower bowl provided with a neck, an upper bowl, a stem carried by the upper bowl and entering the neck of the lower bowl, a resilient sleeve carried by the stem and engaging the neck, a handle carried by the resilient sleeve, a handle carried by the neck of the lower bowl, and intermeshing cam faces carried by the handle of the resilient sleeve and the neck of the lower bowl, whereby the resilient sleeve is expanded against the neck of the lower bowl.

HARRY M. KENNARD.